(No Model.)
W. LEE.
PIPE CLAMP.
No. 452,307. Patented May 12, 1891.
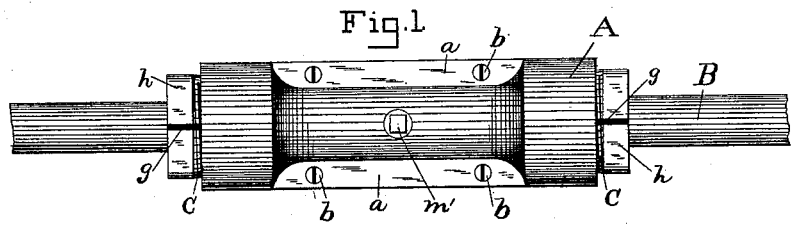
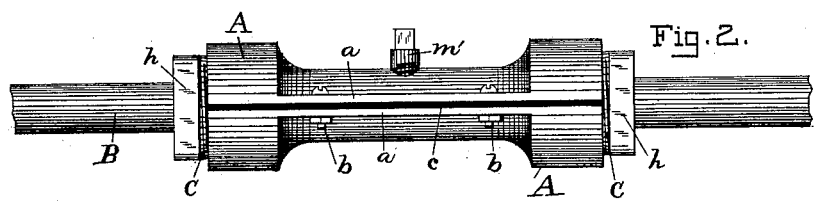
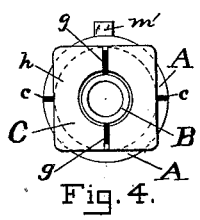 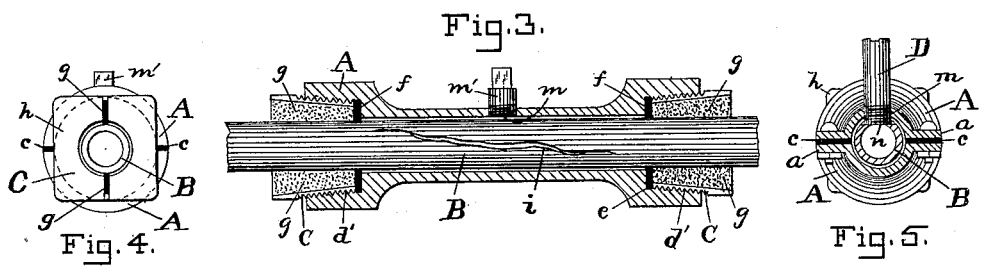 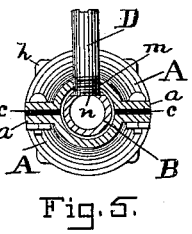
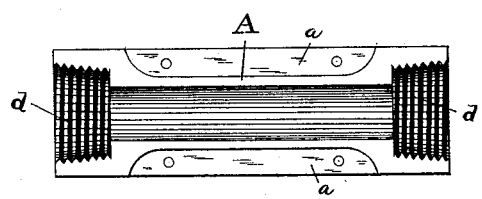 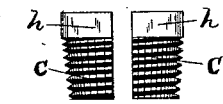
WITNESSES:
Otto H. Ehlers.
F. P. Davis.
INVENTOR:
William Lee,
BY Chas. B. Mann
ATTORNEY.
THE NORRIS PETERS CO., PHOTO-LITHO., WASHINGTON, D. C.

UNITED STATES PATENT OFFICE.

WILLIAM LEE, OF BALTIMORE, MARYLAND, ASSIGNOR OF ONE-HALF TO OLIVER HOBLITZELL, OF SAME PLACE.

PIPE-CLAMP.

SPECIFICATION forming part of Letters Patent No. 452,307, dated May 12, 1891.

Application filed February 5, 1891. Serial No. 380,307. (No model.)

*To all whom it may concern:*

Be it known that I, WILLIAM LEE, a citizen of the United States, residing at Baltimore, in the State of Maryland, have invented certain new and useful Improvements in Pipe-Clamps, of which the following is a specification.

This invention relates to an improvement in clamps for burst or leaking pipes, the object being to produce a cheap and simple arrangement of parts which can be readily applied to a pipe at any point, and will effectually close the leak in the same.

A further object is to so construct the device that it can be utilized in making a branch connection.

With these ends in view the invention consists in the peculiar features of construction and combinations of parts described hereinafter, and pointed out in the claims.

In the accompanying drawings illustrating the invention, Figure 1 is an exterior view of the clamp, as taken from one side; Fig. 2, a similar view of the clamp, taken from another side; Fig. 3, a longitudinal section on line 3 3, Fig. 1; Fig. 4, an end view; Fig. 5, a central cross-section; Fig. 6, a detail of one of the semi-cylindric shells employed; and Fig. 7, a detail showing two views of the parts forming one of the packing-glands fitted in the ends of the clamp.

The clamp comprises a pair of semi-cylindric or half-tubular shells A, fitting on opposite sides of the pipe B, over the leak in the same. Each half-shell is provided with a longitudinal lateral flange $a$ on each side. The flanges of the two half-shells fit up to each other, and the two shells or members are clamped together around the pipe by bolts $b$, passed through the flanges, gaskets $c$ being interposed between the said flanges $a$ to insure a tight joint.

The semi-cylindric shells A at their opposite ends have an enlarged half-circular recess $d$. When said shells are fitted together, these recesses form a stuffing-box $d'$ at each end of the clamp, said boxes having an internal annular shoulder or seat $e$. Packing $f$ of suitable material is on said shoulders $e$ and around the pipe, and glands C are screwed into said stuffing-boxes upon said packing. Each of these glands comprise two half-cylindric nuts, which fit together one on each side of the pipe, suitable gaskets $g$ (see Figs. 1 and 4) being interposed between them. Each half has a square head $h$. It will be observed that when fitted together the two half-nuts form an ordinary gland, which packs the stuffing-box $d'$. This gland is exteriorly threaded and the stuffing-box is provided with corresponding internal threads, whereby the gland can be screwed into the stuffing-box upon the packing $f$, the square heads $h$ serving to facilitate turning the gland. It will be apparent that a clamp with glands of this form can be placed on a pipe at any point without disconnecting the pipe.

It will be seen that when the semi-cylindric shells A are clamped upon the pipe B, over the leak indicated at $i$ in Fig. 3, and the glands C, fitted in the stuffing-boxes $d'$ at the opposite ends of the said shells, the said leak in the pipe will be effectually closed. This device can be quickly and easily applied without skill.

One of the semi-cylindric shells A is provided at the middle with an opening $m$, closed by a screw-plug $m'$. By boring a hole $n$ in the pipe B, as shown in Fig. 5, and causing the said opening $m$ in the shell to register with said pipe-hole $n$, a branch pipe D can be readily joined to the main pipe B by removing the screw-plug $m'$ and inserting the said branch pipe through the opening $m$ and connecting it at the hole $n$. The opening $m$ in the shell being threaded, the branch pipe can be readily screwed into the same. In this manner a branch connection can be quickly effected where desired. The clamps will be made of various sizes, to fit different sizes of pipe.

Having thus described my invention, what I claim as new, and desire to secure by Letters Patent, is—

1. A clamp for leaking pipes, comprising a pair of semi-cylindric tubular shells, each member of the pair to fit on opposite sides of a pipe and provided with longitudinal flanges through which the said members are clamped together, a stuffing-box at each end of said shells, and sectional packing-glands to fit around the pipe in said stuffing-boxes.

2. A clamp for leaking pipes, comprising a pair of half-tubular shells A, each having at its opposite ends an enlarged half-circular recess $d$, and provided on two sides intermediate of said enlarged ends with a longitudinal flange $a$, said half-circular recesses forming stuffing-boxes with internal shoulders $e$, gaskets $c$ to make a tight joint between the longitudinal flanges, packing $f$, seated on said internal shoulders, and two half-cylindric nuts exteriorly threaded and having square heads to screw into said stuffing-boxes onto the packing.

In testimony whereof I affix my signature in the presence of two witnesses.

WILLIAM LEE.

Witnesses:
F. P. DAVIS,
JNO. T. MADDOX.